US006945871B2

United States Patent
Uenishi et al.

(10) Patent No.: US 6,945,871 B2
(45) Date of Patent: Sep. 20, 2005

(54) RECORDING MEDIUM STORING VOLUME CONTROL PROGRAM, VOLUME CONTROL METHOD, VIDEO GAME MACHINE, AND VOLUME CONTROL PROGRAM

(75) Inventors: Takahito Uenishi, Kobe (JP); Yasuhiro Kawabata, Tokyo (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 122 days.

(21) Appl. No.: 10/191,138

(22) Filed: Jul. 9, 2002

(65) Prior Publication Data
US 2003/0013533 A1 Jan. 16, 2003

(30) Foreign Application Priority Data
Jul. 16, 2001  (JP) ........................................ 2001-215744

(51) Int. Cl.[7] .............................................. A63F 13/00
(52) U.S. Cl. ......................................................... 463/35
(58) Field of Search ................................ 463/35, 30, 1

(56) References Cited

U.S. PATENT DOCUMENTS 6,540,613 B2 * 4/2003 Okubo et al. ................. 463/35
6,584,201 B1 * 6/2003 Konstantinou et al. ....... 381/57
2001/0014621 A1 * 8/2001 Okubo et al. ................. 463/35
2002/0094866 A1 * 7/2002 Takeda et al. ................. 463/35

FOREIGN PATENT DOCUMENTS

| EP | 0992929 | 4/2000 |
|---|---|---|
| EP | 1033157 | 9/2000 |
| JP | 4-103192 | 9/1992 |
| JP | 11-168692 | 6/1999 |
| JP | 11249694 | 9/1999 |
| JP | 2000245962 | 9/2000 |
| JP | 2000300833 | 10/2000 |
| JP | 2001-175300 | 6/2001 |

* cited by examiner

*Primary Examiner*—Jessica J. Harrison
(74) *Attorney, Agent, or Firm*—Jordan and Hamburg LLP

(57) ABSTRACT

The present invention provides a volume control program, a volume control method, and a video game machine by which the player can easily hear two sounds which are output simultaneously. Cheering sound is output from the speaker 23 according to the game progress status, the output instructing section 102 instructs output so as to output the sound data of broadcasting sound which is read from the broadcasting sound data storing section 512 by the sound data reading section 101 according to the game progress status as sound, and the volume controlling section 111 drops the volume of the cheering sound to be lower than the volume of the broadcasting sound with the output instruction as a trigger.

13 Claims, 4 Drawing Sheets

RECORDING MEDIUM STORING VOLUME CONTROL PROGRAM, VOLUME CONTROL METHOD, VIDEO GAME MACHINE, AND VOLUME CONTROL PROGRAM

BACKGROUND OF THE INVENTION

1. Field of the Invention

The present invention relates to a volume control program, a recording medium storing said program, a volume control method, and a video game machine for controlling the volume of voice which is output according to the game progress status.

2. Description of the Related Art

In a conventional sport game, which is played virtually in a game space, voices are output according to the game progress status. For example, in the case of a baseball game, the voice of the announcer who broadcasts live is output according to the game progress status to be displayed on the television monitor as if actual live broadcasting of an actual baseball game were being watched. In such a baseball game, various sound effects, such as the cheering of spectators, are also used to make the game more exciting.

With a conventional baseball game, however, when a broadcasting sound is output while the cheering sound of spectators is output, for example, the two voices are output at the same levels of volume, so the broadcasting sound is sometimes lost in the cheering sound of the spectators, which makes the broadcasting sound hard to hear, and which decreases the excitement of the players.

SUMMARY OF THE INVENTION

With the foregoing in view, it is an object of the present invention to provide a volume control program, a volume control method, and a video game machine for providing a game which is exciting for the players by making at least one voice easier to hear when the first voice and the second voice are output simultaneously.

In order to achieve the object, the present relates to a volume control program for controlling the volume of voice which is output according to the game progress status, for making a video game machine function as output means for outputting a first voice and a second voice according to the game progress status, and volume control means for dropping the volume of the first voice to be lower than the volume of the second voice when the second voice is output together with the first voice.

According to the present invention, the volume control program for controlling the volume of voice which is output according to the game progress status, and makes a video game machine function as output means for outputting a first voice and a second voice according to the game progress status, and volume control means for dropping the volume of the first voice to be lower than the volume of the second voice when the second voice is output together with the first voice.

In other words, the first voice and the second voice are output by the video game machine according to the game progress status, and the volume of the first voice is dropped to be lower than the volume of the second voice when the second voice is output together with the first voice.

Since the volume of the first voice is dropped to be lower than the volume of the second voice when the second voice is output together with the first voice according to the game progress status like this, the second voice can be easily heard, and the game becomes exciting for the players.

These and other objects, features and advantages of the present invention will become more apparent upon reading the following detailed description along with the accompanied drawings.

DESCRIPTION OF THE PREFERRED EMBODIMENTS

Figure 1:
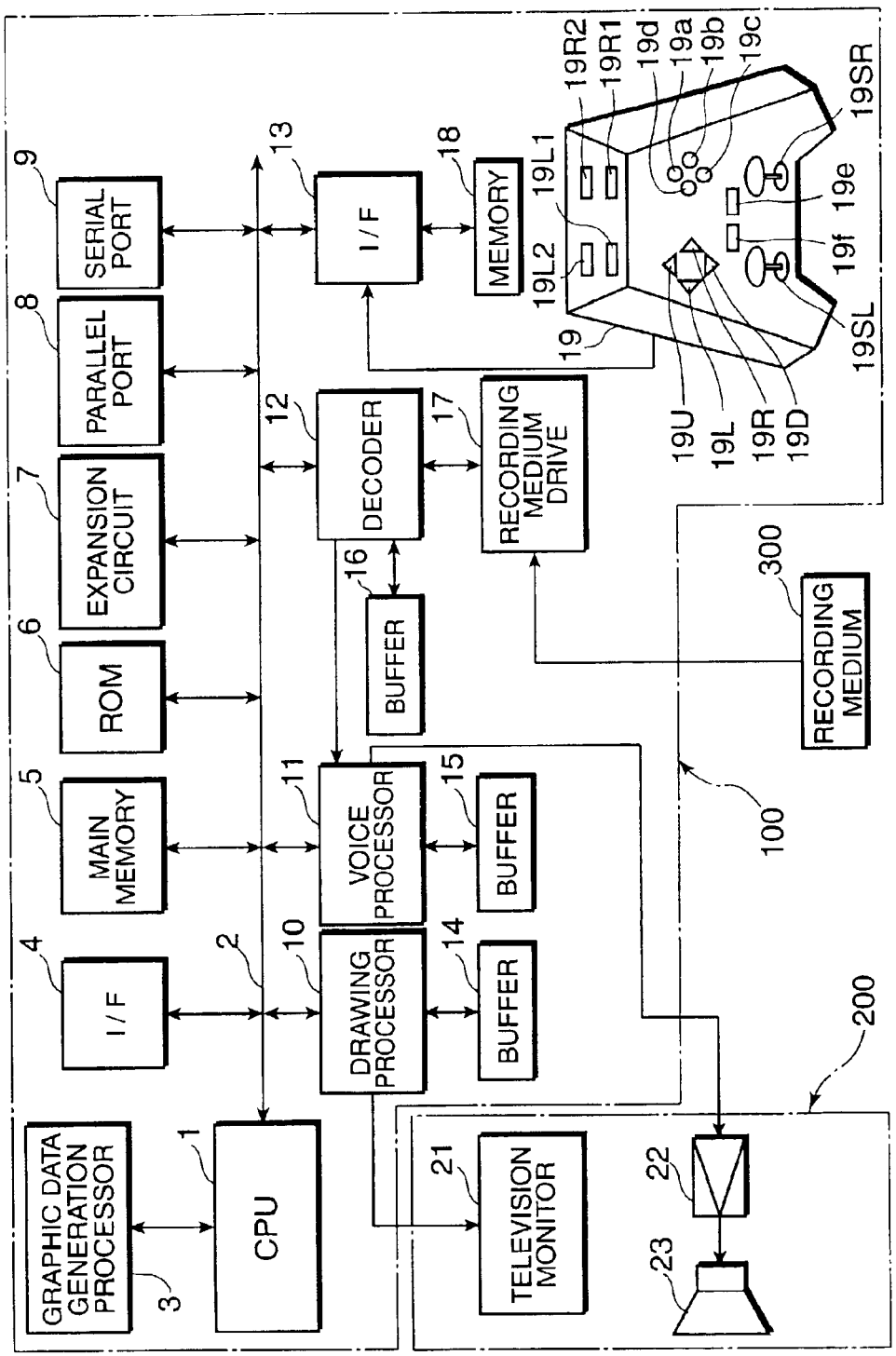
FIG. 1 is a block diagram depicting a configuration of the video game machine according to an embodiment of the present invention.

A video game machine according to the first embodiment of the present invention will be described with reference to the accompanying drawings. FIG. 1 is a block diagram depicting a configuration of the video game machine according to an embodiment of the present invention. In the following description, a home video game machine, which is connected to a home television, is described as an example of the video game machine, but the present invention is not limited to this example, but can be applied to a business video game machine where a monitor is integrated and a personal computer which functions as a video game machine by executing the video game program.

The video game machine shown in FIG. 1 is comprised of a home game machine 100 and a home television 200. In the home game machine 100, a recording medium 300, where program data which a computer can read, has been installed.

The home game machine 100 is comprised of a CPU (Central Processing Unit) 1, bus line 2, graphics data generation processor 3, interface circuit (I/F) 4, main memory 5, ROM (Read Only Memory) 6, expansion circuit 7, parallel port 8, serial port 9, drawing processor 10, voice processor 11, decoder 12, interface circuit 13, buffers 14–16, recording medium drive 17, memory 18, and controller 19. The home television 200 includes a television monitor 21, amplification circuit 22, and a speaker 23.

The CPU 1 is connected to the bus line 2 and the graphics data generation processor 3. The bus line 2 includes an address bus, data bus and control bus, and inter-connects with the CPU 1, interface circuit 4, main memory 5, ROM 6, expansion circuit 7, parallel port 8, serial port 9, drawing processor 10, voice processor 11, decoder 12 and interface circuit 13.

The drawing processor 10 is connected to the buffer 14. The voice processor 11 is connected to the buffer 15 and amplification circuit 22. The decoder 12 is connected to the buffer 16 and recording medium drive 17. And the interface circuit 13 is connected to the memory 18 and controller 19.

The television monitor 21 of the home television 200 is connected to the drawing processor 10. And the speaker 23 is connected to the amplification circuit 22. In the case of a business video game machine, the television monitor 21, amplification circuit 22 and speaker 23 may be housed in one body, along with each block constituting the home game machine 100.

When the video game machine is comprised of a personal computer or workstation as a core, the television monitor 21 corresponds to the display for the computer. The expansion circuit 7, drawing processor 10 and voice processor 11 correspond to a part of program data recorded in the recording medium 300 or hardware on an expansion board mounted on the expansion slot of the computer. The interface circuit 4, parallel port 8, serial port 9 and interface circuit 13 correspond to hardware on the expansion board mounted on the expansion slot of the computer. The buffers 14–16 correspond to each storing area of the main memory 5 or expansion memory (not illustrated) respectively.

Now each composing element shown in FIG. 1 will be described. The graphics data generation processor 3 plays the role of the coprocessor of the CPU 1. In other words, the graphics data generation processor 3 executes coordinate transformation and light source calculation, such as fixed point format matrix and vector operation, by parallel processing.

The major processing executed by the graphics data generation processor 3 is processing to determine the address data of the processing target image on a predetermined display area based on the coordinate data, moving mount data, and rotation amount data of each vertex of the image data, which is supplied from the CPU 1, in two- or three-dimensional space, and to return the address data to the CPU 1, and processing to calculate the luminance of the image according to the distance from a light source, which is virtually set.

The interface circuit 4 is used for interfacing peripheral devices, such as a pointing device, which includes a mouse and track ball. The main memory 5 is comprised of RAM (Random Access Memory). In the ROM 6, program data to be the operating system of the video game machine is stored. This program corresponds to the BIOS (Basic Input Output System) of a personal computer.

The expansion circuit 7 executes expansion processing to compressed images which are compressed by intra-coding, conforming to the MPEG (Moving Picture Experts Group) standard for moving picture, and to the JPEG (Joint Photographic Experts Group) standard for still pictures. Expansion processing includes decode processing (decoding of data encoded by VLC: Variable Length Code), inverse quantization processing, IDCT (Inverse Discrete Cosine Transform) processing, and restoration processing of intra-images.

The drawing processor 10 executes drawing processing for the buffer 14 based on the drawing instruction issued by the CPU 1 at each predetermined time T (e.g. T=1/60 second in one frame).

The buffer 14 is comprised of RAM, for example, and is divided into a display area (frame buffer) and non-display area. The display area is comprised of an expansion area of data to be displayed on the display screen of the television monitor 21. And the non-display area, according to the present embodiment, is comprised of storage areas for data for defining skeletons, model data for defining polygons, animation data for giving motion to a model, and pattern data, texture data and color palette data to show the content of each animation.

In this case, the texture data is two-dimensional image data. The color palette data is data for specifying color, such as for texture data. The data is recorded in the non-display area of the buffer 14 in advance by the CPU 1 at one time from the recording medium 300, or separately a plurality of times according to the game progress status.

A drawing instruction is, for example, a drawing instruction for drawing a three-dimensional image using polygons, or a drawing instruction for drawing a normal two-dimensional image. Here a polygon is a two-dimensional virtual graphic of a polygon, and in the present embodiment a triangle is used.

A drawing instruction for drawing a three dimensional image using polygons is executed for polygon vertex address data for showing the storage position of the polygon vertex coordinate data on the display area of the buffer 14, texture address data for showing the storage position of the texture data to be pasted onto polygons, on the buffer 14 color palette address data for showing the storage position of the color palette data for showing the color of the texture data on the buffer 14, and luminance data for showing the luminance of the texture respectively.

The polygon vertex address data on the display area among the above mentioned data is data when the graphics data generation processor 3 converts the polygon vertex coordinate data in a three-dimensional space from the CPU 1 into two-dimensional polygon vertex coordinate data by executing coordinate transformation based on the moving amount data and rotation amount data of the screen itself. The luminance data is determined based on the distance from the position shown by the polygon vertex coordinate data after the above mentioned coordinate transformation from the CPU 1 to the virtually placed light source which is measured by the graphics data generation processor 3.

The polygon vertex address data indicates the address on the display area of the buffer 14. The drawing processor 10 executes processing to write the texture data corresponding to the range of the display area of the buffer 14, indicated by the three polygon vertex address data.

An object, such as a character, in the game space is comprised of a plurality of polygons. The CPU 1 stores the coordinate data of each polygon in the three-dimensional space in the buffer 14, in association with the vector data of the corresponding skeleton. And when a character is moved on the display screen of the television monitor 21 by the later mentioned operation of the controller 19, the following processing is executed to express the movement of the character or to change the position of viewpoint to view the character.

The CPU 1 provides the graphics data generation processor 3, the three-dimensional coordinate data of the vertex of each polygon which is held in the non-display area of the buffer 14, and the moving amount data and rotation amount data of each polygon which are determined from the data of the coordinate of the skeleton and rotation amount thereof.

The graphics data generation processor 3 sequentially determines the three-dimensional coordinate data of each polygon after moving and rotation based on the three-dimensional coordinate data of the vertex of each polygon and the moving amount data and rotation amount data of each polygon.

Out of the three-dimensional coordinate data of each polygon determined like this, the coordinate data in the horizontal and vertical directions is supplied to the drawing processor 10 as address data on the display area of the buffer 14, that is, the polygon vertex address data.

The drawing processor 10 writes the texture data, which is indicated by pre-assigned texture address data, to the triangular display area of the buffer 14 indicated by the three polygon vertex address data. By this, the object where texture data is pasted on many polygons is displayed on the display screen of the television monitor 21.

A drawing instruction for drawing a regular two-dimensional image is provided for vertex address data, texture address data, color palette address data, which indicates the storing position of the color palette data to indicate the color of the texture data on the buffer 14, and the luminance data, which indicates the luminance of the texture. Out of this data, the vertex address data is the coordinate data acquired by the graphics data generation processor 3, executing coordinate transformation for the vertex coordinate data from the CPU 1 on a two-dimensional plane based on the moving amount data and rotation amount data from the CPU 1.

The voice processor 11 stores the ADPCM (Adaptive Differential Pulse Code Modulation) data, which is read from the recording medium 300, in the buffer 15, and the ADPCM data stored in the buffer 15 becomes the sound source.

The voice processor 11 also reads the ADPCM data from the buffer 15 based on a clock signal with a 44.1 kHz frequency, for example. The voice processor 11 executes pitch conversion, noise addition, envelope setting, level setting, verberation addition, and other processing for the ADPCM data which was read.

When the voice data which is read from the recording medium 300 is such PCM data as CD-DA (Compact Disk Digital Audio), the PCM data is converted into ADPCM data by the voice processor 11. Processing for the PCM data by a program is directly executed in the main memory 5. The PCM data processed in the main memory 5 is supplied to the voice processor 11, is converted to ADPCM data, then the above mentioned various processings are executed on ADPCM data, and voice is output from the speaker 23.

For the recording medium drive 17, a DVD-ROM drive, CD-ROM drive, hard disk drive, optical disk drive, flexible disk drive, silicon disk drive, and a cassette medium reader, for example, are used. In this case, the recording medium 300 is a DVD-ROM, CD-ROM, hard disk, optical disk, flexible disk, and semiconductor memory, for example.

The recording medium drive 17 reads the image data, voice data, and program data from the recording medium 300, and supplies the read data to the decoder 12. The decoder 12 executes error correction processing by ECC (Error Correction Code) for the data reproduced from the recording medium drive 17, and supplies the data after the error correction processing to the main memory 5 or the voice processor 11.

For the memory 18, a card type memory, for example, is used. A card type memory is used for holding various game parameters at a point of interruption, such as the case of holding the status at a point of interruption when the game is interrupted midway.

The controller 19 is an operating device for the user to use for inputting various operation instructions, and transmits operation signals, according to the operation by the user, to the CPU 1. The controller 19 has a first button 19a, second button 19b, third button 19c, fourth button 19d, up key 19U, down key 19D, left key 19L, right key 19R, L1 button 19L1, L2 button 19L2, R1 button 19R1, R2 button 19R2, start button 19e, select button 19f, left stick 19SL, and right stick 19SR.

The up key 19U, down key 19D, left key 19L and right key 19R are used, for example, for providing commands, to move a character and cursor vertically and horizontally on the screen of the television monitor 21, to the CPU 1.

The start button 19e is used to instruct the CPU 1 to load a game program from the recording medium 300. The select button 19f is used to instruct the CPU 1 to make various selections on the game program to be loaded from the recording medium 300 to the main memory 5.

Each button and each key of the controller 19, excluding the left stick 19SL and right stick 19SR, is comprised of an ON/OFF switch which is turned ON when pressed down from the neutral position by an external pressing force, and is turned OFF when the switch returns to the neutral position after the pressing force is released.

The left stick 19SL and right stick 19SR are stick type controllers having roughly the same configuration as a joy stick. In other words, the left stick and right stick has an upright stick which can be tilted in a 360° direction including the front, back, left and right, with a predetermined position of the stick as a fulcrum. The left stick 19SL and right stick 19SR transmit the values of the x coordinate, which is in the left/right direction, and the values of the Y coordinate, which is in the front/back direction, when the upright position is the origin, to the CPU 1 via the interface circuit 13 as the operation signals according to the tilt direction and tilt angle of the stick.

The first button 19a, second button 19b, third button 19c, fourth button 19d, L1 button 19L1, L2 button 19L2, R1 button 19R1, and R2 button 19R2 are used for various functions according to the game program which is loaded from the recording medium 300.

The general operation of the above mentioned video game machine will now be described. When the recording medium 300 is loaded on the recording medium drive 17, and when the power switch (not illustrated) is turned ON and power is supplied to the video game machine, the CPU 1 instructs the recording medium drive 17 to read the game program from the recording medium 300 based on the operating system stored in the ROM 6. By this, the recording medium drive 17 reads the image data, voice data, and program data from the recording medium 300. The image data, voice data, and program data which were read are supplied to the decoder 12, and the decoder 12 executes error correction processing for each data.

The image data, for which the decoder 12 executed error correction processing, is supplied to the expansion circuit 7 via the bus line 2. The image data, for which the expansion circuit 7 executed the above mentioned expansion processing, is supplied to the drawing processor 10, and is written to the non-display area of the buffer 14 by the drawing processor 10. The voice data, for which the decoder 12 executed error correction processing, is written to the buffer 15 via the main memory 5 or the voice processor 11. The program data, for which the decoder 12 executed error correction processing, is written to the main memory 5.

The CPU 1 progresses the video game based on the game program stored in the main memory 5 and on the content which the user instructs using the controller 19. In other words, the CPU 1 controls image processing, controls voice processing, and controls internal processing based on the content which the user instructs using the controller 19.

Control of image processing is, for example, calculating the coordinates of each skeleton from the pattern data for the animation to be instructed to the characters, or calculating the vertex coordinate data of polygons, supplying the obtained three-dimensional coordinate data and viewpoint position data to the graphics data generation processor 3, and issuing a drawing instruction, including the address data and luminance data on the display area of the buffer 14, determined by the graphics data generation processor 3.

Control of voice processing is, for example, issuing a voice output command to the voice processor 11 and specifying the level and reverberation. Control of internal processing is, for example, executing operation according to the operation of the controller 19.

Now the case of when a baseball game is played using a video game machine configured as above will be described. This baseball game is a matching game where a baseball game is played between a self team comprised of a plurality of self characters (baseball players) which the user can operate, and an opponent team comprised of a plurality of opponent characters (baseball players) which another user, to be an opponent, or a computer, can operate.

The player operates the controller 19 so that the self characters displayed on the television monitor 21 perform various operations according to the baseball game, such as batting and pitching.

In this baseball game, as an effect of simulating actual baseball game broadcasting, the cheering sound of spectators is output according to the game program status. Also broadcasting sound by an announcer and commentator is output according to the game progress status.

Figure 2:
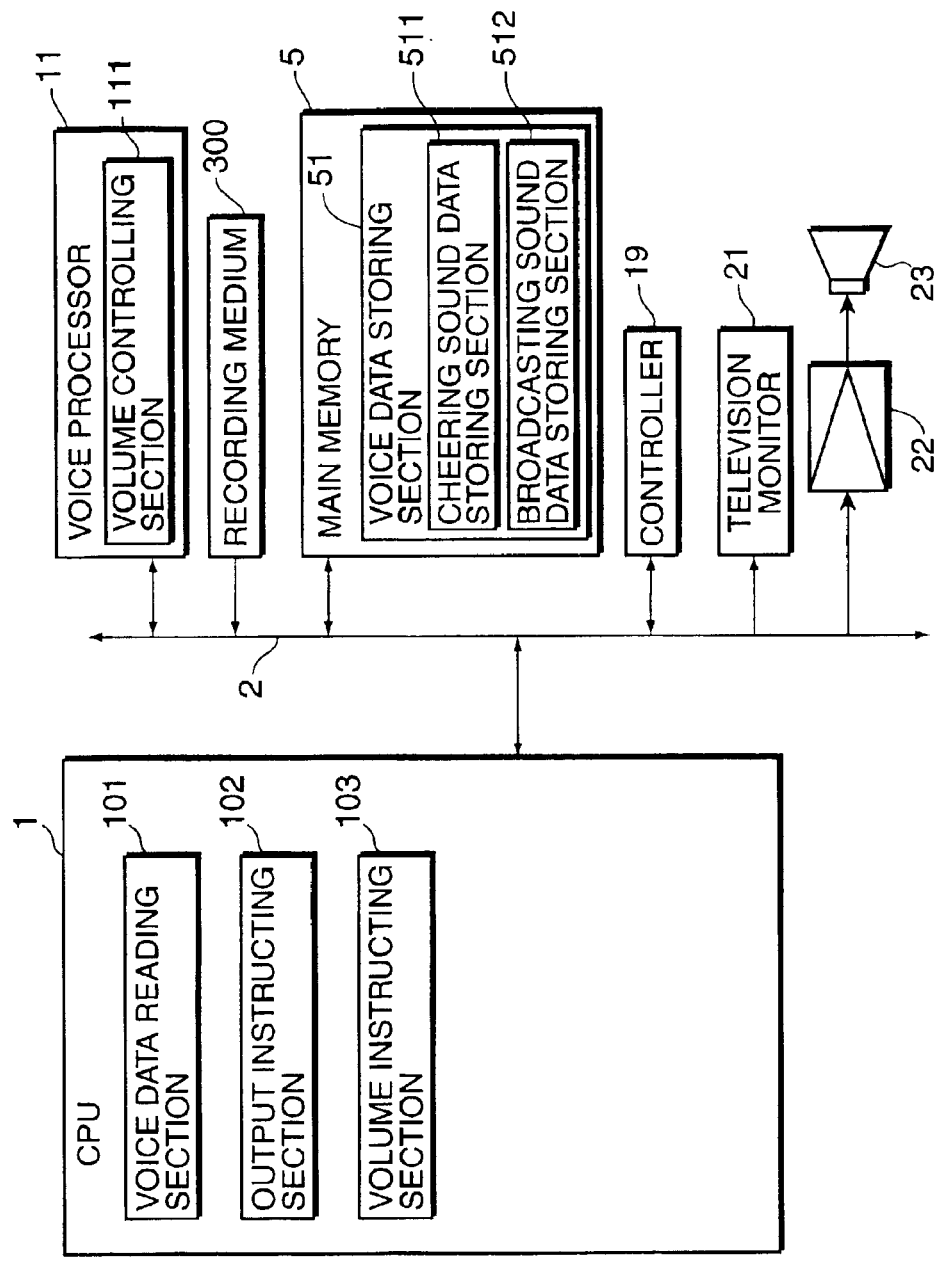
FIG. 2 is a block diagram depicting a functional configuration of the CPU 1, particularly the operation of the video game machine shown in FIG. 1.

FIG. 2 is a block diagram depicting the functional configuration of the CPU 1, including the operation of the video game machine shown in FIG. 1. In FIG. 2, only bus line 2, main memory 5, voice processor 11, controller 19, television monitor 21, speaker 23, and recording medium 300 are shown as the composing elements, other than the CPU 1, to simplify description.

In FIG. 2, the game program, including the volume control program, is stored in the recording medium 300, and the baseball game can be played by executing this volume control program.

The CPU 1 functions as the voice data reading section 101, output instructing section 102, and volume instructing section 103 by reading and executing the volume control program stored in the recording medium 300, and the voice processor 11 functions as the volume controlling section 111, and the main memory 5 functions as the voice data storing section 51.

The voice data reading section 101 has a function to read voice data, such as the broadcasting sound and various sound effects according to the game program status, from the voice data storing section 51. The voice data storing section 51 also manages voice data by labels, and includes the cheering sound data storing section 511 for storing voice data on cheering sound, which is one of the sound effects, and broadcasting sound data storing section 512 for storing the voice data on broadcasting sounds.

For example, according to the present invention, action by a character includes hitting, catching and pitching, and operation according to the operation of the controller 19 by the player is reflected in the action of the character, and influences the game progress status. For example, when a batter character (self character) hits a ball pitched by the pitcher character (opponent character), voice data with the waveform "He hit it" is read from the broadcasting sound data storing section 512. If the result is a hit, the voice data having the waveform "Hit" is read from the broadcasting sound data storing section 512.

The voice data reading section 101 has a function of reading the voice data of the cheering sound of spectators from the cheering sound data storing section 512. For example, according to the baseball game of the present embodiment, the cheering sound of spectators is read according to the game progress status as a sound effect to make the game exciting.

The output instructing section 102 has a function to issue a voice output instruction to the voice processor 11 to output the voice data read by the voice data reading section 101. The voice processor 11 executes control to output the voice data, which was read, from the speaker 23 as voice.

The volume instructing section 103 executes processing to drop the volume of the voice being output as a cheering sound down to a predetermined volume by a trigger when the voice data of the broadcasting sound is read by the voice data reading section 101, and the output of the voice data of the broadcasting sound to the voice processor 11 is instructed by the output instructing section 102, and instructs the level of the volume of the cheering sound to the volume control section 111. When the output of the broadcasting sound ends, the voice instructing section 103 executes processing to increase the volume of the cheering sound to the original level, and instructs the level of the volume of the cheering sound to the volume control section 111.

The voice controlling section 111 controls the volume so as to output the cheering sound at the level instructed by the volume instructing section 103.

Figure 3:
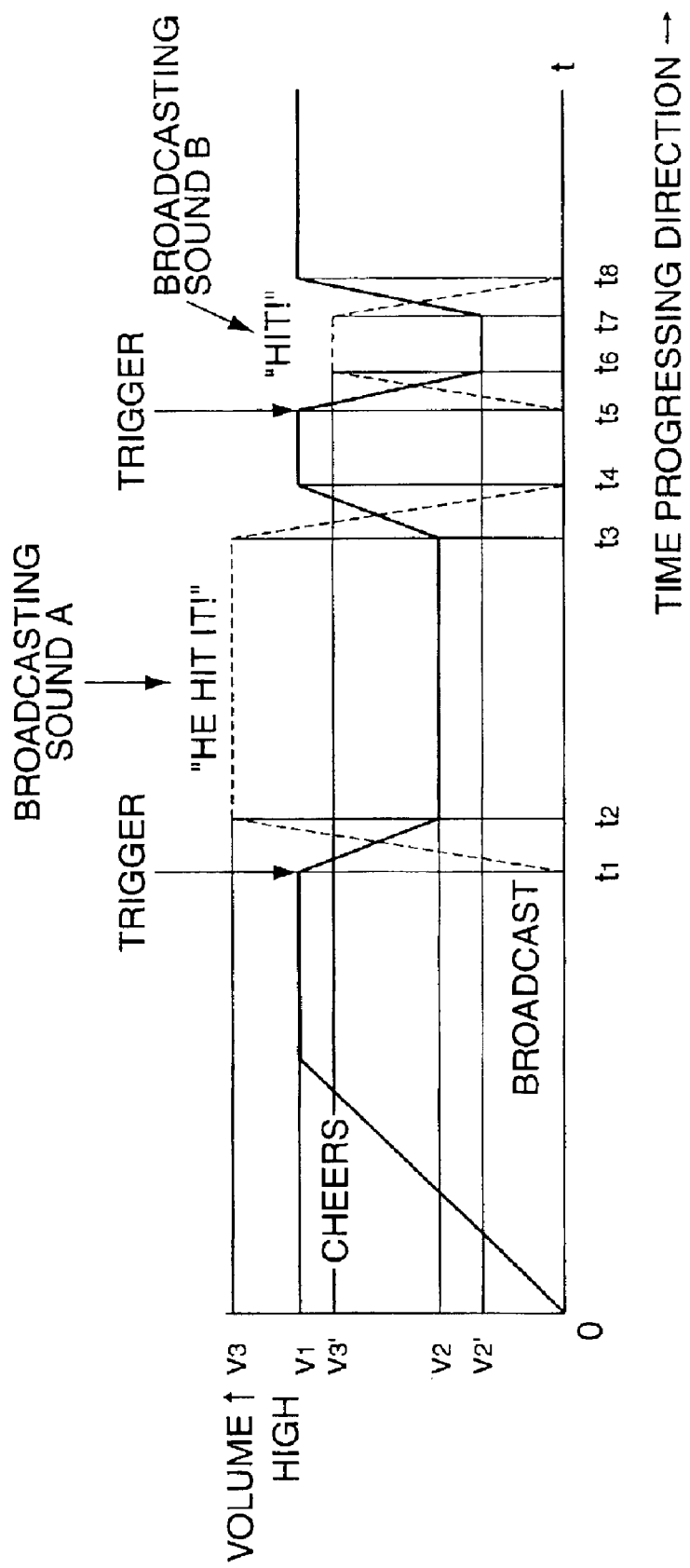
FIG. 3 is a diagram depicting the relationship between the volume of the cheering sound, broadcasting sound, and elapsed time.

FIG. 3 is a diagram depicting the relationship between the volume of the cheering sound, broadcasting sound, and elapsed time, where the ordinate is the volume and the abscissa is the elapsed time. The solid line shown in FIG. 3 shows the change of the volume of the cheering sound by the elapsed time, and the dashed line shows the change of the volume of the broadcasting sound by the elapsed time. At first, the voice data to be the cheering sound is read from the cheering sound data storing section 511 by the voice data reading section 101, and the cheering sound is output at volume V1. It is assumed that the self character hit the ball at time t1. Then the voice data reading section 101 reads the voice data "He hit it" to be broadcasting sound A from the broadcasting sound data storing section 512, and instructs the voice processor 11 to output the read voice data by the output instructing section 102. The volume instructing section 103 executes processing for dropping the cheering sound from volume v1 to volume v2 with the output instruction of the voice data as a trigger. Then at time t2, the cheering sound is dropped to the volume v2, and the broadcasting sound A reaches the volume v3. When the output of the broadcasting sound A ends at time t3, the volume instructing section 103 executes processing for returning the cheering sound from the volume v2 to volume v1. Processing of the broadcasting sound B during time t5 to t8 is also performed in the same way as the processing during the above mentioned time t1 to t4.

In the present embodiment, the output instructing section 102 corresponds to the output instructing means, the volume instructing section 103 and volume controlling section 111 correspond to the volume control means, the voice processor 11 and speaker 23 correspond to the output means, the first voice corresponds to the cheering sound, and the second voice corresponds to the broadcasting sound.

Figure 4:
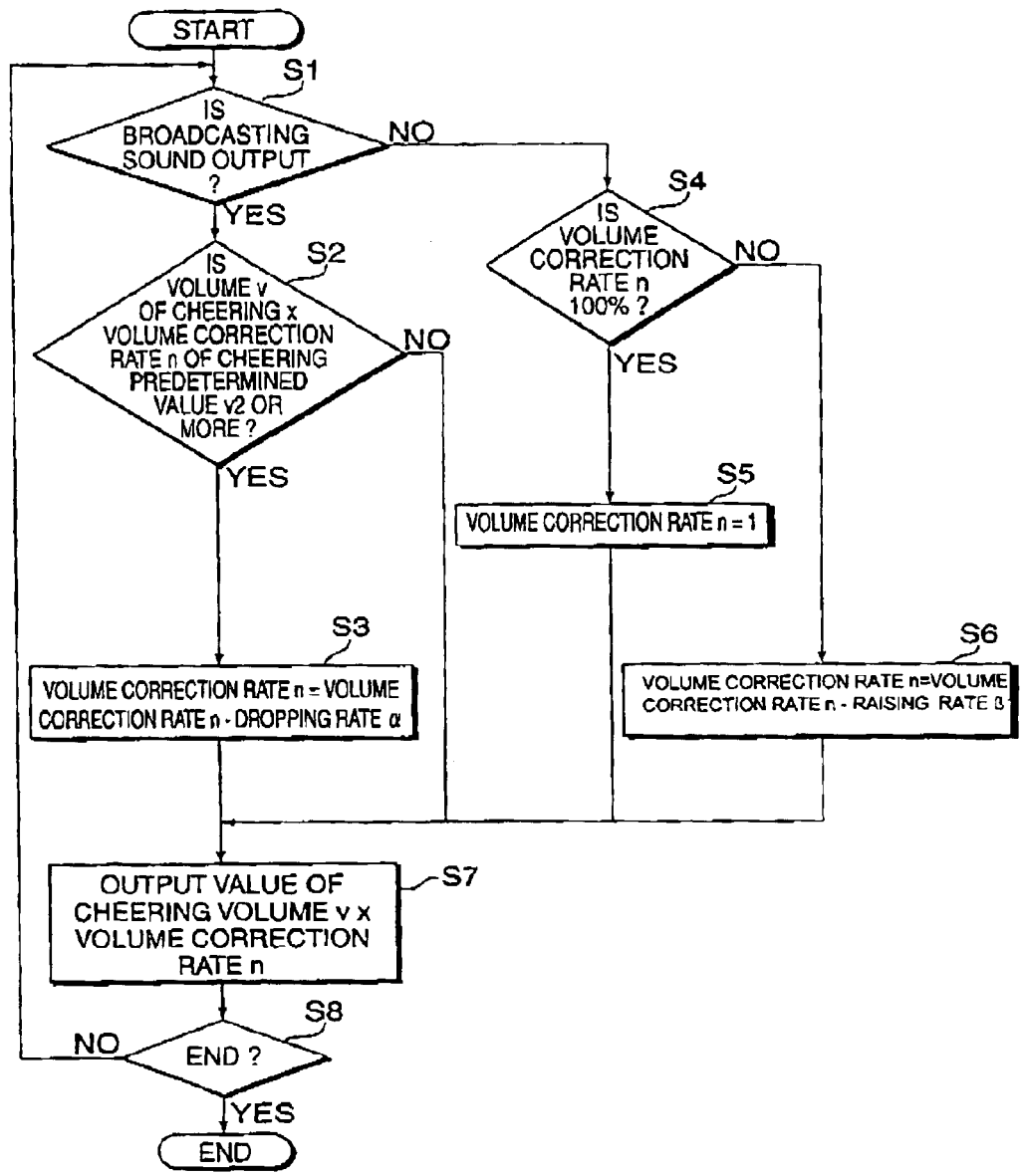
FIG. 4 is a flow chart depicting the volume control method by the video game machine shown in FIG. 2.

FIG. 4 is a flow chart depicting the volume control method by the video game machine shown in FIG. 2. The volume control method shown in FIG. 4 is performed by the CPU 1, reading and executing the volume control program stored in the recording medium 300.

At first, in Step S1, the CPU 1 judges whether the broadcasting sound is being output. If it is judged that the broadcast sound is being output, processing moves to Step S2, and if it is judged that the broadcasting sound is not being output, processing moves to Step S4. In Step S2, the CPU 1 judges whether the volume v of the cheering sound x the volume correction rate n ($0 \leq n \leq 1$) is a predetermined value $v_2$ or more. This predetermined value $v_2$ is a value of the volume which has been incorporated and set in a program. Here if the result is the predetermined value $v_2$ or more, processing moves to Step S3. In Step S3, the CPU 1 sets a new volume correction rate n, and processing moves to Step S7. Specifically, the volume correction rate n this time is determined by the volume correction rate n of this time=volume correction rate n of previous time−dropping ratio α. The dropping ratio α is a numerical value which is preset.

If it is judged that the broadcasting sound is not being output in Step S1, the CPU 1 judges whether the volume correction rate n is 100% (n=1) in Step S4. If it is judged that the volume correction rate n is 100%, the CPU 1 sets n=1 in Step S5, and processing moves to Step S7.

If it is judged that the volume correction rate n is not 100% in Step S4, processing moves to Step S6. In Step S6, the CPU 1 sets a new volume correction rate n, and processing moves to Step S7. Specifically, the volume correction rate n of this time is determined by the volume correction rate n of this time=volume correction rate n of previous time+raising rate β. The raising rate β is a numerical value which is preset.

In Step S7, the CPU 1 instructs the voice processor 11 to output the voice at the volume determined by multiplying volume v of the cheering sound by the volume correction rate n, and the voice processor 11 controls so as to output the voice from the speaker 23 at the instructed volume.

In Step S8, the CPU 1 judges whether the output of the cheering sound ended, and if it is judged as ended, the CPU 1 ends processing, and if it is judged as not ended, processing moves to Step S1, and processing from Steps S1 to S8 is repeatedly executed. When the broadcasting sound is output, the processing from Step S1 to S8 is repeatedly executed until the volume of the cheering sound changes from $v_1$ to $v_2$, where the cheering sound drops in steps from volume $v_1$ to volume $v_2$. When the output of the broadcasting sound ends, processing from Steps S1 to S8 is repeatedly executed until the volume of the cheering sound changes from $v_2$ to $v_1$, where the cheering sound rises in steps from volume $v_2$ to volume $v_1$.

In the case of the present embodiment, the time of $t_1$ to $t_2$ and $t_3$ to $t_4$ (FIG. 3) can be changed by changing the values of the dropping rate α and the raising rate β according to the output time of the broadcasting sound. In other words, when the output time of the broadcast sound is long (broadcasting sound A in FIG. 3), the broadcasting sound can be heard even if it takes some time to drop the volume of the cheering sound, so the time required for dropping the volume $v_1$ to volume $v_2$ ($t_1$ to $t_2$) is set longer by setting the dropping rate α to low. When the output time of the broadcasting sound is short (broadcasting sound B in FIG. 3), the volume of the cheering sound must be dropped quickly, so the dropping rate α is set to high so as to decrease the time required for dropping the volume $v_1$ to volume $v_2'$ ($t_5$ to $t_6$), which makes it easier to hear the broadcasting sound and makes the game exciting for the players. Also by setting the raising rate β to low, the time required for raising the volume $v_2$ and volume $v_2'$ to the volume $v_1$ can be increased, and by setting the raising rate β to high, the time required for raising the volume $v_2$ and volume $v_2'$ to the volume $v_1$ can be decreased.

In this way, the volume of the first voice is dropped to be lower than the volume of the second voice when the second voice is output together with the first voice according to the game progress status, so the second voice can be more easily heard, and the game becomes more exciting for the players.

In the present embodiment, the volume of the cheering sound may be changed according to the volume of the broadcasting sound to be output along with the game progress status. In other words, the volume controlling means changes the volume of the first voice according to the volume of the second voice corresponding to the game progress status. This means that, as FIG. 3 shows, when the broadcasting sound A is output at high volume $v_3$, the broadcasting sound A can be heard even if the volume $v_2$ of the cheering sound after dropping the volume is relatively high, so the amplitude to drop the volume of the cheering sound is decreased. When the broadcasting sound B is output at low volume $v_3'$, the broadcasting sound B cannot be heard unless the volume $v_2$ of the cheering sound after dropping the volume is further decreased, so the amplitude to drop the volume of the cheering sound is increased, and the cheering sound is output at the volume $v_2'$.

In the present embodiment, the volume of the cheering sound may be changed according to the significance of the broadcasting sound to be output corresponding to the game progress status. In other words, the volume controlling means changes the first voice according to the significance of the second voice corresponding to the game progress status. When a particularly significant broadcasting sound is output, the volume $v_2$ is set to low, and the volume of the voice to be output as the cheering sound is further decreased. When an insignificant broadcasting sound is output, the volume $v_2$ is set to high, and the volume of the cheering sound is not dropped very much. By this, the difference between the volume of the broadcasting sound and the volume of the cheering sound is increased, therefore a particularly significant broadcasting sound can be more easily heard, and the game becomes more exciting for the players.

Also in the present embodiment, the volume to be output of the voice data to be the broadcasting sound can be held as volume data. In other words, for the second voice, the amplitude of the volume to be output may be held as volume data. By holding the volume of the second voice to be output as volume data, it becomes possible, for example, to increase the amplitude to drop the volume of the cheering sound, which is the first voice, when the volume of the broadcasting sound, which is the second voice, is low (volume at which the broadcasting sound is hard to hear), and to decrease the amplitude to drop the volume of the cheering sound, which is the first voice, when the volume of the broadcasting sound, which is the second voice, is high (volume at which the broadcasting sound is easily heard). As a result, the value of the dropping volume of the first voice can be changed according to the volume of the second voice, without always dropping the volume of the first voice to a predetermined value.

Also in the present embodiment, the value of the first voice may be dropped before outputting the second voice according to the game progress status or action of characters. In other words, in the case of a game where the next game progress status is known in advance, the volume of the first voice is dropped sufficiently before outputting the second voice. Since the first voice is dropped sufficiently before outputting the second voice in advance according to the next game progress status, the second voice can be heard even more easily.

Also in the present embodiment, the video game machine may function as data input detection means, for detecting the data input of the second voice to be output along with the first voice according to the game progress status, where the volume controlling means drops the volume of the first voice to be lower than the volume of the second voice with the detected data input of the second voice as a trigger. In other words, when the data input of the second voice is detected, the volume of the first voice is dropped to be lower than the volume of the second voice with the detected data input of the second voice as a trigger, so the burden to be applied on the processing of the CPU 1 can be decreased.

In the present embodiment, the case when at least two voices, cheering sound and broadcast sound, are simultaneously output, was described, but the present invention is not limited to this, but can be applied to the case when three or more voices are simultaneously output. In this case, priority is assigned to the voice data in advance, and the value of the volume $v_2$ is decreased for a voice with high priority, and the value of $v_2$ is increased as the priority decreases. As a result, three or more voices are output at different volumes, and a respective voice can be heard more easily, and the game becomes more exciting for the players.

The video game to which the present invention is applied is not particularly limited to the above mentioned baseball game, but the present invention can be suitably applied to a sports game where broadcasting is performed according to the game progress status, such as a soccer game and a basketball game.

The present invention can also be suitably applied to video games other than the above mentioned sports games, where the first voice and second voice are different. For example, the present invention can be applied when the voice of a DJ (Disk Jockey) is output as the second voice, while BGM (Background Music) is output as the first voice.

In summary, the present invention relates to a recording medium which stores a volume control program for controlling the volume of voice which is output according to the game progress status, for making a video game machine function as output means for outputting a first voice and a second voice according to the game progress status, and volume control means for dropping the volume of the first voice to be lower than the volume of the second voice when the second voice is output together with the first voice.

According to the aforementioned invention, the volume control program stored in the recording medium for controlling the volume of voice which is output according to the game progress status, and makes a video game machine function as output means for outputting a first voice and a second voice according to the game progress status, and volume control means for dropping the volume of the first voice to be lower than the volume of the second voice when the second voice is output together with the first voice.

In other words, the first voice and the second voice are output by the video game machine according to the game progress status, and the volume of the first voice is dropped to be lower than the volume of the second voice when the second voice is output together with the first voice.

Since the volume of the first voice is dropped to be lower than the volume of the second voice when the second voice is output together with the first voice according to the game progress status like this, the second voice can be easily heard, and the game becomes exciting for the players.

In the above invention, the video game machine can also function as output instruction means for instructing to output the second voice together with the first voice, and the volume control means drops the volume of the first voice to be lower than the volume of the second voice with the output instruction as the trigger.

In other words, the video game machine also functions as output instruction means for instructing to output the second voice together with the first voice according to the game progress status, and the volume control means drops the volume of the first voice to be lower than the volume of the second voice with the output instruction as the trigger.

In other words, the volume of the first voice is dropped to be lower than the volume of the second voice by the video game machine with the output instruction to output the second voice as the trigger, so the second voice can be easily heard, and the game becomes exciting for the players.

Accordingly, the volume of the first voice is dropped to be lower than the volume of the second voice with the output instruction to output the second voice as a trigger, so the second voice can be more easily heard, and the game becomes exciting for the players.

Furthermore, the invention is characterized in that when the volume of the first voice is dropped to be lower than the volume of the second voice, the dropping rate of the volume of the first voice is changed according to the output time of the second voice.

In the above invention, when the volume of the first voice is dropped to be lower than the volume of the second voice, the dropping rate of the volume of the first voice is changed according to the output time of the second voice.

In other words, the volume dropping time of the first voice can be set to a suitable time according to the second voice by changing the dropping rate for dropping the volume of the first voice according to the output time of the second voice, so the second voice can be easily heard, and the game becomes exciting for the players.

Moreover, the invention is characterized in that the volume of the first voice after dropping is changed according to the volume of the second voice. According to the characterized features, the dropping time and raising time of the volume of the first voice can be set to suitable times according to the second voice, so the second voice can be easily heard, and the game becomes exciting for the players.

Thus, the volume of the first voice after dropping is changed according to the volume of the second voice.

In other words, the volume of the first voice is changed according to the volume of the second voice, so if the volume of the second voice is low, the second voice can be more easily heard by increasing the amplitude to drop the first voice, then the game becomes exciting for the players. If the volume of the second voice is high, the second voice can be more easily heard by decreasing the amplitude to drop the first voice, then the game becomes exciting for the players. Accordingly, the volume of the first voice is set according to the volume of the second voice, so the amplitude to drop the first voice is increased when the volume of the second voice is low, and the amplitude to drop the first voice is decreased when the volume of the second voice is high, therefore the second voice can be easily heard, and the game becomes exciting for the players.

The present invention also relates to a volume control method for controlling the volume of the voice which is output according to the game progress status, comprising an output step for a video game machine to output a first voice and a second voice according to the game progress status, and a volume control step for the video game machine to drop the volume of the first voice to be lower than the volume of the second voice when the second voice is output together with the first voice.

According to the present invention in the above described form, the volume control method for controlling the volume of the voice which is output according to the game progress status comprises an output step for a video game machine to output a first voice and a second voice according to the game progress status, and a volume control step for the video game machine to drop the volume of the first voice to be lower than the volume of the second voice when the second voice is output together with the first voice.

In other words, the first voice and the second voice are output by the video game machine according to the game progress status, and the volume of the first voice is dropped to be lower than the volume of the second voice when the second voice is output together with the first voice. Since the volume of the first voice is dropped to be lower than the volume of the second voice when the second voice is output together with the first voice according to the game progress status like this, the second voice can be easily heard, and the game becomes exciting for the players. According to the present invention in claim 5, the volume of the first voice is dropped to be lower than the volume of the second voice when the second voice is output together with the first voice according to the game progress status, so the second voice can be more easily heard, and the game becomes exciting for the players.

The present invention, furthermore, relates to a video game machine for controlling the volume of voice which is output according to the game progress status, comprising output means for outputting a first voice and a second voice according to the game program status, and volume control means for dropping the volume of the first voice to be lower than the volume of the second voice when the second voice is output together with the first voice.

According to the invention as described, the video game machine for controlling the volume of voice which is output according to the game progress status, comprises output means for outputting a first voice and a second voice according to the game program status, and volume control means for dropping the volume of the first voice to be lower than the volume of the second voice when the second voice is output together with the first voice.

In other words, the first voice and the second voice are output by the video game machine according to the game progress status, and the volume of the first voice is dropped to be lower than the volume of the second voice by the video game machine when the second voice is output together with the first voice.

Since the volume of the first voice is dropped to be lower than the volume of the second voice when the second voice is output together with the first voice according to the game progress status like this, the second voice can be easily heard, and the game becomes exciting for the players. Accordingly, the volume of the first voice is dropped to be lower than the volume of the second voice when the second voice is output together with the first voice according to the game progress status, so the second voice can be more easily heard, and the game becomes exciting for the players.

This application is based on Japanese Patent Application Serial No. 2001-215744 filed in Japan Patent Office on Jul. 16, 2001, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A recording medium storing a volume control program for controlling a volume or sound which is output according to a game progress status, wherein said volume control program causes a video game machine to perform the steps comprising:

outputting a first sound;

outputting a second sound at a second sound volume level maintained for a second sound duration period according to the game progress status;

dropping the volume of the first sound in accordance with a dropping rate to a first sound lower volume level greater than zero and lower than the second sound volume level of said second sound when said second sound is output together with said first sound; and said dropping rate of the volume of said first sound being changed according to the second sound duration period of said second sound.

2. The recording medium according to claim 1, wherein said volume control program further causes the video game machine to preform the step comprising issuing an output instruction instructing to output said second sound together with said first sound, wherein said step of dropping includes using said output instruction as a trigger.

3. The recording medium according to claim 1, wherein said dropping rate of the first sound is set such that the longer the second sound duration period of the second sound, the smaller the dropping rate of the first sound is.

4. The recording medium according to claim 1, wherein the first sound is set to begin to drop at the same time with the timing of commencing a rise of the volume of the second sound to the second sound volume level.

5. A recording medium storing a volume control program for controlling a volume of sound which is output according to the game progress status, wherein said volume control program makes a video game machine perform the steps comprising:

outputting a first sound;

outputting a second sound at a second sound volume level maintained for a second sound duration period according to the game progress status;

dropping the volume of the first sound in accordance with a dropping rate to a first sound lower volume level greater than zero and lower than the second sound volume level of said second sound when said second sound is output together with said first sound;

said dropping rate of the volume of said first sound being changed according to the second sound duration period of said second sound; and the first sound lower volume of the first sound after dropping being changed according to the second sound volume of said second sound.

6. The recording medium according to claim 5, wherein the lowered volume of the first sound after fully dropped is set higher than that of the first sound when the output volume of the second sound after fully raised is higher.

7. The recording medium according to claim 5, wherein said dropping rate of the first sound is set such that the longer the second sound duration period of the second sound, the smaller the dropping rate of the first sound is.

8. The recording medium according to claim 5, wherein the first sound is set to begin to drop at the same time with the timing of commencing a rise of the volume of the second sound.

9. A volume control method for controlling a volume of sound which is output according to a game progress status, said method comprising the steps of:

outputting a first sounds;

outputting a second sound at a second sound volume level maintained for a second sound duration period according to the game progress status;

dropping the volume of the first sound in accordance with a dropping rate to a first sound lower volume level greater than zero and lower than the second sound volume level of said second sound when said second sound is output together with said first sound; and said dropping rate of the volume of said first sound being changed according to the second sound duration period of said second sound.

10. A video game machine for controlling a volume of sound which is output according to a game progress status, comprising:

output means for outputting a first sound and outputting a second sound at a second sound volume level maintained for a second sound duration period according to the game progress status;

volume control means for dropping the volume of the first sound in accordance with a dropping rate to a first sound lower volume level greater than zero and lower than the second sound volume level of said second sound when said second sound is output together with said first sound; and said volume control means changing said dropping rate of the volume of said first sound according to the second sound duration period of said second sound.

11. The video game machine according to claim 10, further comprising output instruction means for issuing an output instruction instructing to output said second sound together with said first sound, wherein said volume control means drops the volume of the first sound to be lower than the second sound volume level of said second sound using said output instruction as a trigger.

12. A video game machine for controlling a volume of sound which is output according to a game process status, comprising:

output means for outputting a first sound and outputting a second sound at a second sound volume level maintained for a second sound duration period according to the game progress status;

volume control means for dropping the volume of the first sound in accordance with a dropping rate to a first sound lower volume level greater than zero and lower than the second sound volume level of said second sound when said second sound is output together with said first sound; and said volume control means changing said dropping rate of the volume of said first sound according to the second sound duration period of said second sound, and changing the volume of the first sound after dropping according to the second sound volume level of said second sound.

13. A recording medium storing a volume control program for controlling a volume of sound which is output according to a game progress status, wherein said volume control program causes a video game machine to perform the steps comprising:

outputting a first sound;

outputting a second sound at a second sound volume level maintained for a second sound duration period according to the game progress status;

dropping the volume of the first sound in accordance with a dropping rate to a first sound lower volume level greater than zero and lower than the second sound volume level of said second sound when said second sound is output together with said first sound such that the maintained second sound and the lowered first sound are maintained at the respective volume levels for said second sound duration period; and said dropping rate of the volume of said first sound being changed according to the second sound duration period of said second sound.

* * * * *